United States Patent [19]
Morell

[11] 3,879,147
[45] Apr. 22, 1975

[54] WEDGE FOR GRIPPING A MULTI-PLY CABLE

[76] Inventor: Juan Coll Morell, Calle Amilcar 209, Barcelona, Spain

[22] Filed: Oct. 25, 1973

[21] Appl. No.: 409,365

[30] Foreign Application Priority Data
Nov. 6, 1972    Spain .................... 185731

[52] U.S. Cl. ............... 403/369; 403/374; 403/409; 24/122.6; 24/115 M
[51] Int. Cl. ............................................ F16g 11/04
[58] Field of Search .......... 24/136 R, 115 R, 122.6; 403/374, 369, 371

[56] References Cited
UNITED STATES PATENTS

| 222,125 | 12/1879 | Brady | 403/369 |
|---|---|---|---|
| 1,857,436 | 5/1932 | Cole | 403/371 |
| 2,025,556 | 12/1935 | Stahl | 403/369 |
| 3,701,509 | 10/1972 | Stinton | 52/223 L |

FOREIGN PATENTS OR APPLICATIONS

| 257,068 | 4/1963 | Australia | 24/115 R |
|---|---|---|---|
| 475,728 | 5/1929 | Germany | 24/115 R |
| 715,993 | 12/1931 | France | 403/369 |
| 999,646 | 2/1952 | France | 24/136 R |
| 885,265 | 12/1961 | United Kingdom | 403/369 |
| 1,559,526 | 1/1965 | Germany | 52/223 L |

*Primary Examiner*—Bernard A. Gelak
*Attorney, Agent, or Firm*—Steinberg & Blake

[57] ABSTRACT

Frustoconical wedges for gripping cables are described and shown which are circumferentially divided into a plurality of complementary parts which are held in the assembled state by a retaining ring located in a circumferential recess. The wedge has a bore to receive the cable, the walls of which are helically grooved to correspond to the helical plies of the cable.

4 Claims, 6 Drawing Figures

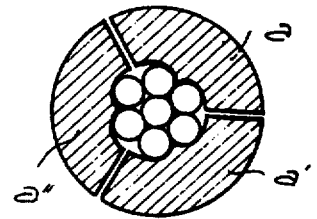
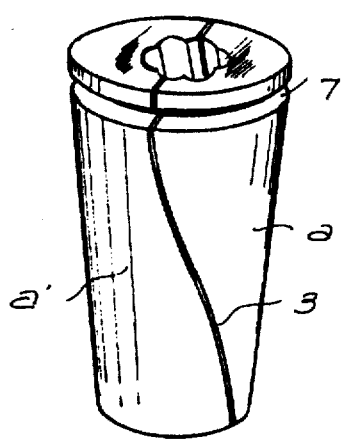
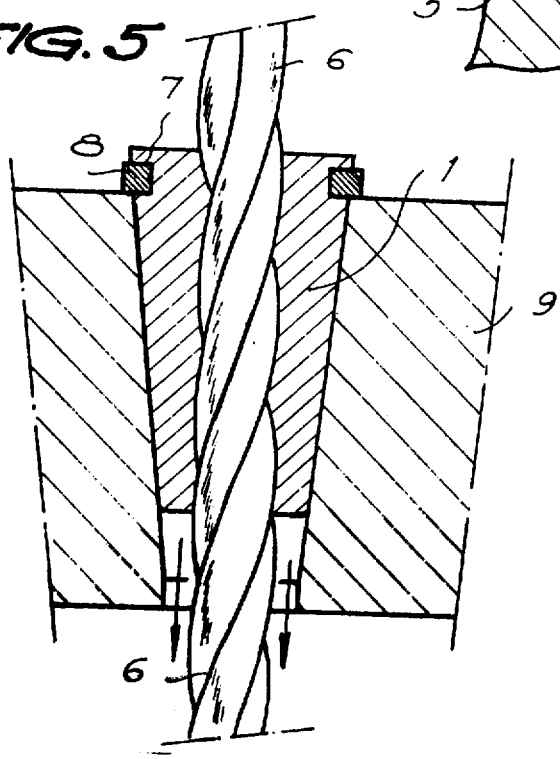
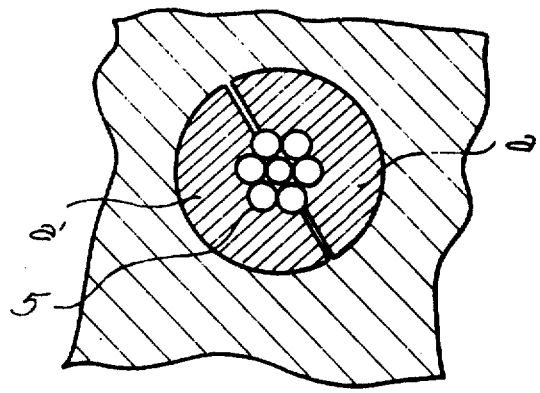

3,879,147

WEDGE FOR GRIPPING A MULTI-PLY CABLE

This invention relates to a wedge for gripping a multi-ply cable, more particularly a cable having helically wound plies at its outer surface, and is for use in the anchoring of cables employed in building work, especially cables used to stress concrete structural elements.

It is an object of the invention to provide a wedge combining a plurality of advantageous features, both with regard to effective gripping engagement with the cable and with regard to the reliability and ease of location and use.

According to the invention there is provided a wedge for gripping a multi-ply cable, having two longitudinal ends, a frustoconical outer surface between the ends and a helically grooved inner surface providing a bore to receive the cable extending longitudinally from end to end of the wedge, the wedge being circumferentially divided into a plurality of mutually separate complementary parts each of which extends from end to end of the wedge, the wedge further having a circumferential recess in its outer surface adjacent its larger end adapted to receive a retaining ring for maintaining the said parts in the assembled state.

The helical grooves of the inner surface of the wedge should correspond to the cable plies, and in use each may accommodate either one or more of the plies. The wedge may be divided as aforesaid at planar surfaces extending radially of the frustoconical axis or at surfaces which in the longitudinal direction extend helically with the same pitch as the helical grooves of the said inner surface providing the bore. In the latter case the dividing surfaces may intersect the peaks or troughs of the grooves on the inner surface.

The outer surface of the wedge is formed near the larger end, and preferably parallel thereto, with the said circumferential recess which is to receive a ring for retaining the said separate parts of the wedge when it is mounted on the cable and also for supporting the wedge in an aperture in a member, e.g., anchoring means for the cable, in which the wedge is to be wedged.

Engagement between the interior of the wedge and the cable to be stressed may be facilitated by internal toothing and/or by providing a composition comprising in suspension carborundum or other abrasive material.

The invention also provides the combination of the wedge as above described with a multi-ply cable having helically wound plies at its exterior surface and anchoring means having a frustoconical aperture adapted to receive the wedge, the wedge being lodged in the aperture and the cable extending through the bore in the wedge and being gripped thereby, wherein the pitch of the said helically wound plies is substantially the same as that of the helical grooves of the inner surface of the wedge. Usually the anchoring means will be a plate having a plurality of frustoconical apertures for the lodgement of a plurality of the wedges gripping a plurality of the cables which are together tensioned in order to stress a structural member.

Various embodiments of the invention will now be described by way of non-limitative example and with reference to the accompanying diagrammatic drawings, in which:

FIG. 3 is a perspective view of a second wedge embodying the invention, which is divided at helical surfaces;

FIG. 4 is a transverse section through a third wedge embodying the invention, which is divided into three parts and also through a cable gripped by the wedge;

FIG. 5 is an axial section through the wedge of FIG. 1 and also a cable gripped by it and part of an anchoring plate; and FIG. 6 is a transverse section through the parts shown in FIG. 5.

Figure 1:
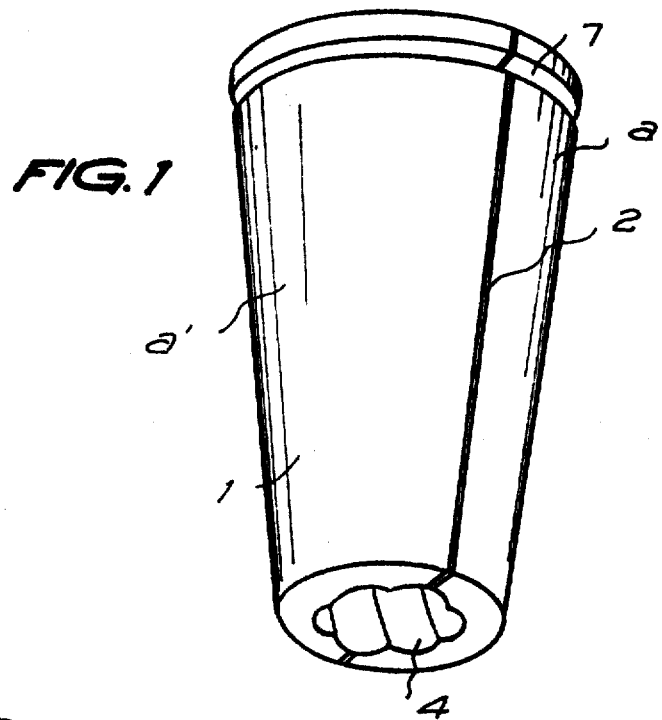
FIG. 1 is a perspective view of a first wedge embodying the invention, which is circumferentially divided into two parts.
Figure 2:
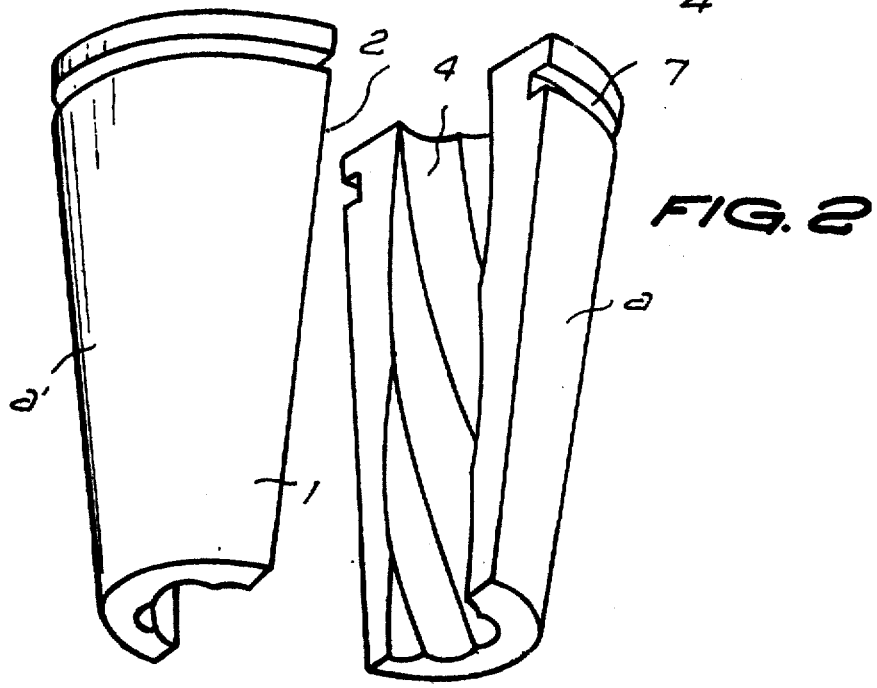
FIG. 2 is a perspective view of the wedge of FIG. 1 with the two parts separated from each other.

In the drawings, the corresponding parts of the various embodiments illustrated are given the same reference numerals. For example in FIGS. 1, 3 and 5, the recess for the retaining ring is in each case identified by the numeral 7. The points of similarity between the embodiments will not in general be described for each embodiment.

The wedges shown are suitable for gripping a multi-ply cable for instance a steel cable, having helically wound plies at its outer surface. The plies will usually be individual filaments, as in the case of the cable shown in FIGS. 4 to 6 which is a strand used as a tendon in a concrete structural member. Alternatively, each ply may be a plurality of filaments.

The wedge of FIG. 1 has a frustoconical outer surface extending between its two longitudinal ends which are planar and perpendicular to the frustoconical axis. It is divided circumferentially in that it consists of two mutually separate and complementary parts $a, a'$ divided at a diametral plane 2 and each extending from end to end of the wedge. The inner surface 4 of the wedge 1 is constituted by the helically grooved inner surfaces of the parts $a, a'$ which provide a straight, axial bore for the cable which extends from end to end of the wedge. The helical pitch of the grooves of the surface 4 is chosen to correspond substantially to that of the plies of the cable with which the wedge is to be used, so that the plies fit the grooves, as can be seen in FIG. 5.

Near the larger end of the wedge, the outer surface has a circumferential recess or groove 7 parallel to the said larger end and suitably shaped and of a size to receive an annular retaining ring 8 (see FIG. 5) which serves the purpose of retaining the parts $a, a'$ in the assembled state when mounted on a cable and so facilitates the use of the wedge. T! ring 8 may also engage the lip of an aperture in an anc. oring plate 9 in which the wedge 1 is lodged to hold the wedge in position (see FIG. 5).

In the wedge of FIG. 3, the two parts $a, a'$ are divided at surfaces 3 which extend radially from the bore to the outer surface and in the longitudinal direction extend helically with the same helical pitch and in the same direction of twist as the grooves of the inner surface 4. As can be seen in FIG. 3, the surfaces 3 intersect the grooves of the surface 4 at the latters' troughs, i.e., their radially deepest points.

The wedge of FIG. 4 is circumferentially divided into three identical parts $a, a', a''$. The helical grooves in the inner surface 4 of this wedge each accommodate two plies 5 of the cable which it is shown surrounding. This is to be compared with FIG. 6 where it can be seen that each helical groove of the wedge accommodates one ply of the cable.

In use, the wedges described are mounted in their various parts a, a' etc. about the cable 6 and disposed in the interior of a frustoconical aperture orifices in the anchoring plate 9, so that in proportion as the cable 6 is tensioned in the direction of the arrows of FIG. 5, the wedge is increasingly firmly imprisoned in the aperture and increasingly grips the cable to retain it.

In order to increase the gripping action between the wedge 1 and the cable 6, there is provided in the inner face of the helical grooves of the wedge a toothed or gripping portion, or there may be interposed between them a mixture comprising a suspension of carborundum or other abrasive material.

The advantages of the illustrated wedges embodying the invention will be appreciated from the description and from the accompanying drawings. It is clear that the mounting of the wedge on the cable and in the anchoring plate is readily and reliably effected and, furthermore, the gripping action between the wedge and the cable is excellent, the gripping action tending to increase in proportion as the cable is progressively tensioned.

With this, the manufacture of the wedges need not be complicated and can be effected by known metallurgical processes, for example by casting or by drawing the wedge through a die formed with ribs which will form the inner, grooved structure of the wedge. In the latter case, if it is desired that the inner grooves or channels of the wedge should correspond more exactly to a predetermined cross section, the drawing operation may be effected by disposing in the interior of the wedge a core of shape and dimensions adequate for the desired result and which may be subsequently extracted with the aid of an appropriate extractor device. The bore of the wedge is not necessarily formed by boring.

While the invention has been illustrated above by reference to preferred embodiments thereof, it will be understood by those skilled in the art that various changes may be made without departing from the spirit and scope of the invention and it is intended to cover all such changes and modifications by the appended claims.

What is claimed is:

1. In an assembly for gripping a multi-ply cable, a wedge having two longitudinal ends, a frustoconical outer surface between the ends and a helically grooved inner surface providing a bore to receive the cable extending longitudinally from end to end of the wedge, said helically grooved inner surface conforming substantially to the configuration of plies of a cable received in said bore, the wedge being circumferentially divided into a plurality of mutually separate complementary parts each of which extends from end to end of the wedge, and the circumferential divisions of the wedge extending helically along the latter in the interior of grooves at said inner surface of said bore helically along said grooves in the deepest parts thereof, the wedge further having a circumferential recess in its outer surface adjacent its larger end adapted to receive a retaining ring for maintaining the said parts in the assembled state.

2. In an assembly according to claim 1 further comprising a retaining ring in the said circumferentail recess, anchoring means having a frustoconical aperture in which said wedge is located for gripping a cable extending through said bore, and said retaining ring engaging a surface of said anchoring means for limiting the extent to which said complementary parts approach each other at said circumferential divisions.

3. In an assembly as recited in claim 2, said anchoring means having a flat surface in a plane normal to the axis of said bore engaging said retaining ring, and said retaining ring having a flat surface engaging said surface of said anchoring means.

4. In an assembly as recited in claim 3 and wherein said circumferential recess and said retaining ring are both of substantially rectangular cross section with said retaining ring completely filling and extending radially beyond said circumferential recess.

* * * * *